United States Patent Office 3,008,339
Patented Nov. 14, 1961

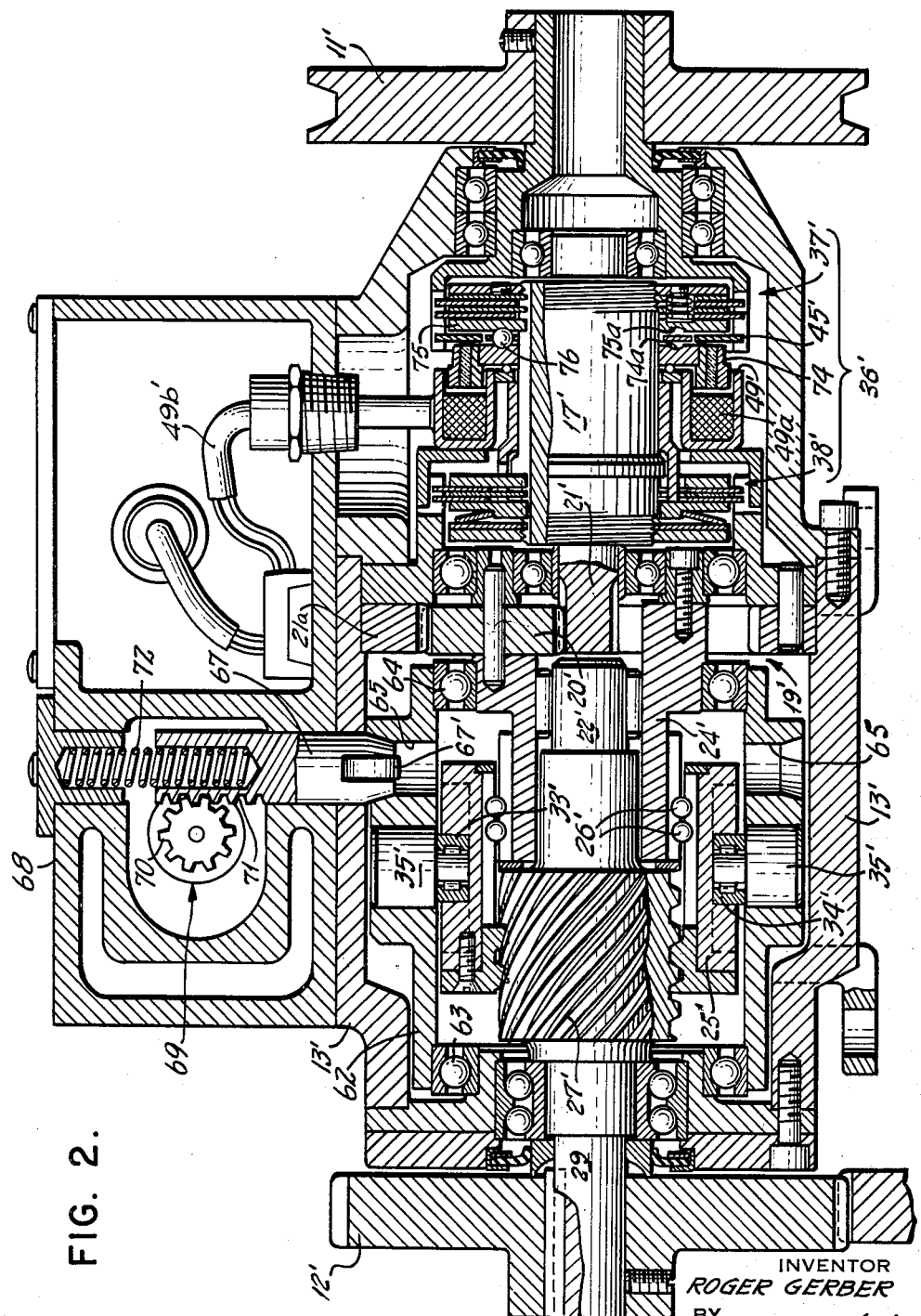

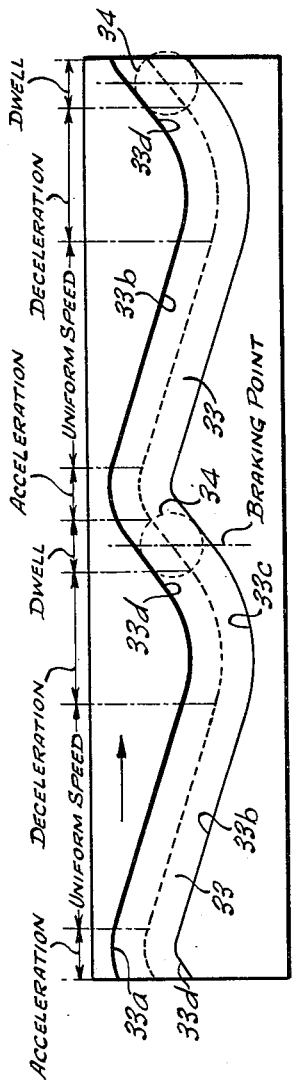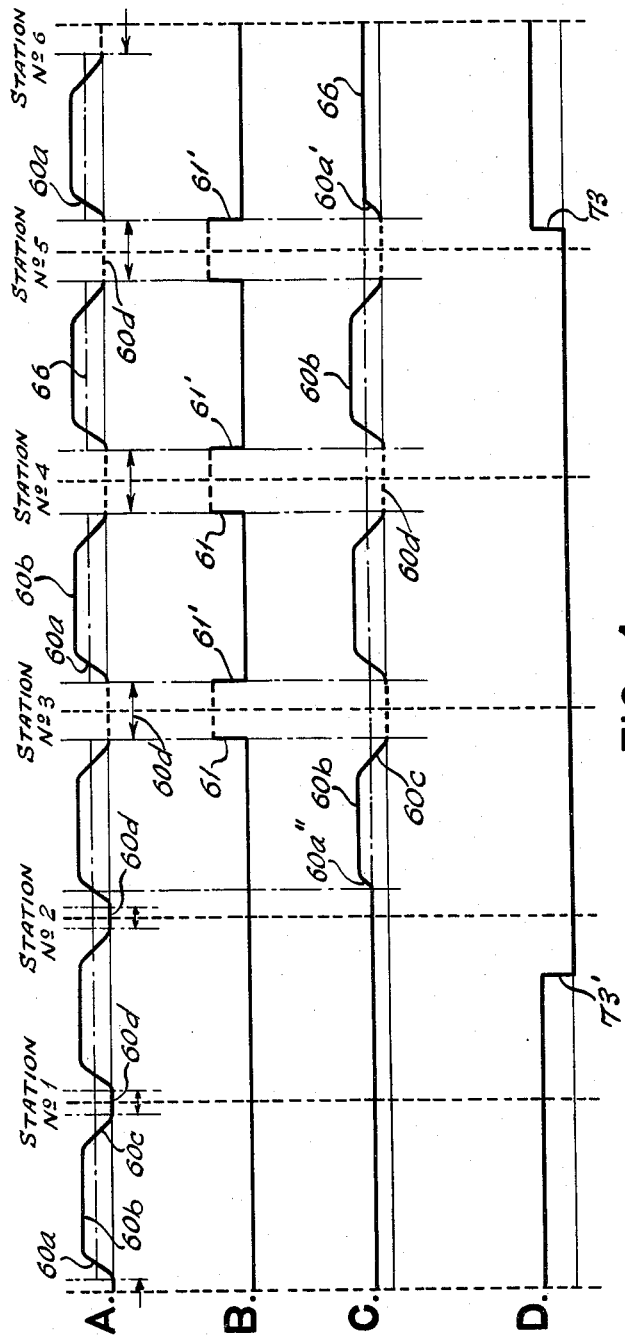

3,008,339
TRANSMISSION
Roger Gerber, Kensington, Conn., assignor to The New Britain Machine Company, New Britain, Conn., a corporation of Connecticut
Filed Oct. 10, 1958, Ser. No. 766,426
9 Claims. (Cl. 74—394)

My invention relates to periodic transmission systems and in particular to periodic drive systems for indexing a driven part through a sequence of positions.

In devices such as machine tools, there are requirements that movable parts, e.g. the spindle carrier of a multiple-spindle screw machine, or the longitudinal multi-sided tool slide of a single-spindle machine, as disclosed in Montgomery et al. Patent 2,680,281, be indexed through a succession of positions. In multiple-spindle operations, for example, it is required that the several spindles be presented to the array of tool stations, loading stations or the like in various sequences. In the simplest case, the successive stations are brought into play in order, one after the other; in the more complicated cases the stations are encountered in different sequences, as in set-ups that require indexing the spindle carrier through two successive stations before presenting the tools to the work. Also in a machine tool as disclosed in said Montgomery et al. patent, the work cycle may require indexing the tool slide, for example, from station No. 1 to station No. 4. In order to index a movable part such as a multiple-spindle carrier from station to station, it is necessary to accelerate and decelerate the part for each displacement. Conventional indexing mechanisms result in heavy loads being imposed on the drive system, particularly in the deceleration phases of the motion, and the parts must normally be designed to absorb high stresses throughout. When it is necessary to index a machine element successively through a plurality of stations with the conventional or Geneva index system, the indexed element accelerates from zero to peak velocity and immediately decelerates to zero for each index. The reaction due to the high inertia forces of relatively large indexible machine elements imposes severe strains on the drive train and may also seriously affect the accuracy of the machine. To overcome these undesirable conditions, the high-speed event of the work cycle is slowed down to reduce peak velocity, but this method only adds to the idle or nonproductive time of the machine.

Accordingly, it is one object of the present invention to provide an improved transmission for indexing a movable part among a plurality of stations wherein any desired sequence of stations can be readily obtained without requiring that the movable part be brought to rest at intermediate stations.

Another object of the invention is to provide an improved transmission for indexing a movable part whereby acceleration and deceleration rates can be established at any desired values so that maximum indexing speeds can be obtained for any given driving mechanism.

It is also an object of the invention to provide an improved transmission for cyclical indexing in which the input power may be coupled to and uncoupled from the mechanism while the indexible part is at rest.

A further object is to provide an improved transmission for indexing a rotatable machine part, wherein the rotary velocity of the indexible machine part accelerates from zero to uniform accelerated speed and decelerates to zero, whereby said uniform speed endures for the major portion of the index cycle.

A still further object is to provide an improved mechanism wherein the torque reaction during indexing is absorbed by the fixed frame instead of the coupling means.

Briefly, in accordance with the present invention there is provided a mechanism including a continuously rotatable input member and an output member to be coupled to an intermediate rotary system which, through a selective multiple clutch, can be clutched to the input member to turn therewith or which can be frictionally coupled to a fixed frame part to afford a brake to arrest all movement of the intermediate system. A step-down gear mechanism, such for example as a planetary gear system, affords a reduced rotary motion, which is in turn applied to a pair of rotary telescoping sleeve members, one of which is movable axially of the other, preferably through a spline and ball coupling. The output of the system takes the form of a rotary member including an integral threaded portion of relatively steep pitch which meshes with correspondingly pitched threads on the axially movable sleeve. The sleeve is driven axially to and fro by a cam drive which can take the form of a continuous circumferential cam track in the surface of the sleeve engaged by stationary follower or drive members to cause the sleeve to shift itself axially upon rotation. In operation, assuming the clutch stage of the multiple clutch is engaged, as by means of an electromagnetic actuator, the input rotary motion drives the axially movable sleeve through the planetary gear system at a reduced rate, which rotational component is passed directly to the input member through the threaded coupling. In addition, any axial movement of the sleeve in one direction will generate and impart an additional component of rotary motion to the output member. This component either adds to or subtracts from the purely rotary component deriving from the planetary gear system. By appropriate selection of the cam-track profile, the output member can be accelerated and decelerated at any desired rates, and moreover, the axial component of sleeve motion can be arranged to exactly neutralize the purely rotary component of motion so that the output member can be brought to a complete rest or dwell.

The deceleration forces are isolated from the planetary gear system and other parts of the drive, including the clutch system, by means of the frame-supported cam-follower members. When the output member is brought to rest at a given station and it is desired to maintain that position for any desired length of time, the multiple-clutch mechanism is actuated, as by deenergizing the electro-magnetic controller, for example, to disengage the continuously movable input member from the intermediate rotary system and simultaneously to engage the brake to maintain the entire intermediate system as well as the output member in the fixed, dwell position.

It is also possible, in accordance with the present invention, to cause the output member to pass through any desired number of stations or positions at which it would normally be brought to rest, by freeing the cam followers from the frame member at the start of an index cycle. To this end, the cam followers are mounted in a member rotatably supported in the frame and normally coupled thereto by a releasable holding member. When the rotatable member is secured to the frame by the holding member, the indexing action, as described above, obtains at each successive station. When the holding member is actuated to release the rotatable member, the cam drive is momentarily disabled by cutting off its driving reference to the frame so that the basic rotary component of motion continues to be applied to the output member with no modulation by the internally generated rotary component. The continuous rotation occurs until such time as the holding member is re-engaged to re-establish the cam drive, all under the control of a master programming system.

The above and other features and objects of the present invention will be readily understood from the following specification describing preferred embodiments thereof, the specification having reference to the accompanying drawings in which:

FIGURE 2 is a similar view in vertical section of a modified mechanism;

FIGURE 3 is a developed plan view of a typical cam track pattern useful in the systems of FIGURES 1 and 2; and FIGURE 4 is a series of four time graphs depicting motions of the output or indexed member of the mechanisms of FIGURES 1 and 2 and also indicating the timing of control actions for the mechanism.

Figure 1:
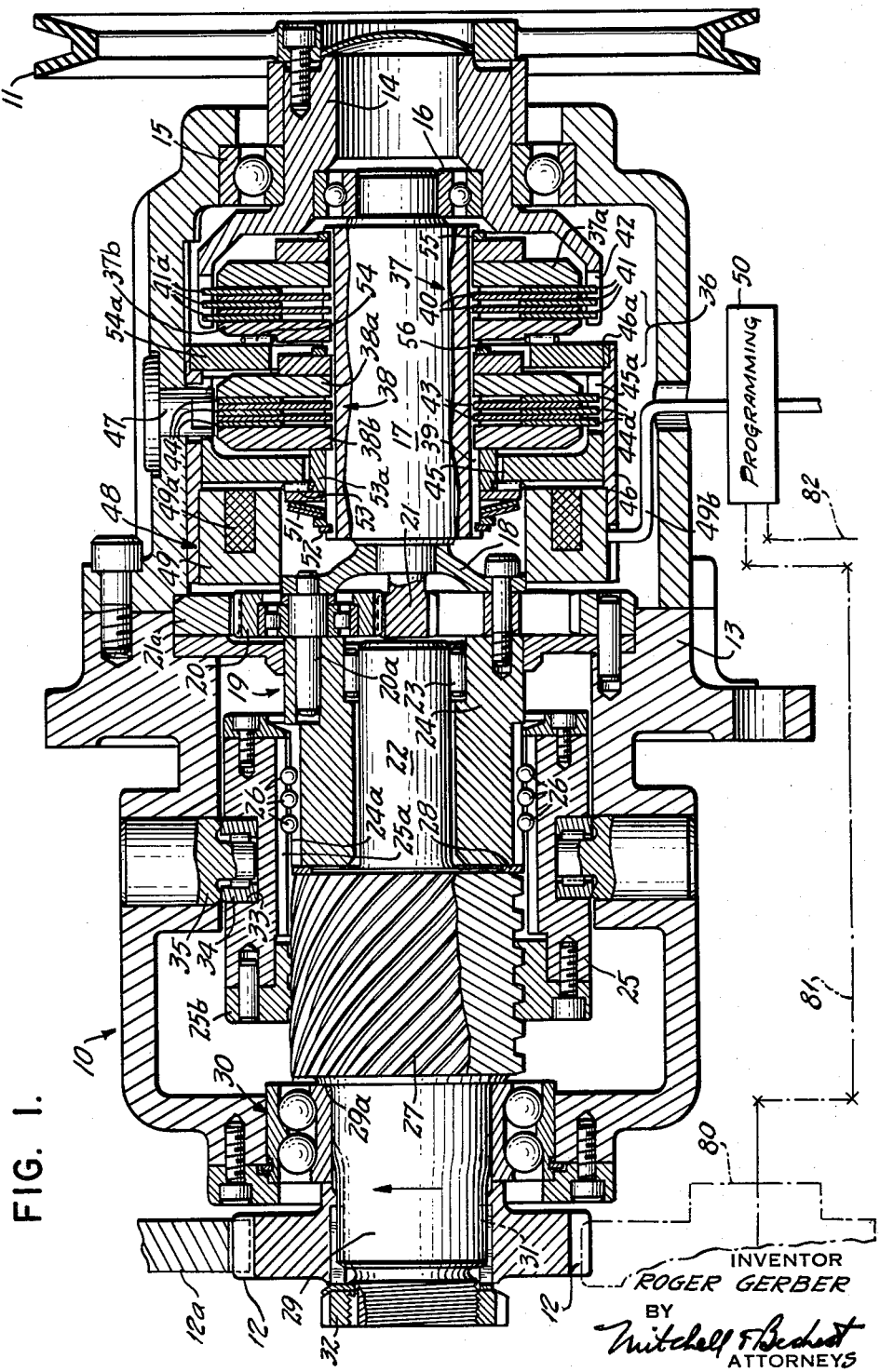
FIGURE 1 is a view in vertical section taken through the longitudinal axis of rotation of a mechanism.

Referring to FIGURE 1, the invention is illustrated as embodied in a mechanism indicated generally by the numeral 10 in which a continuous rotary input motion, introduced through the pulley wheel 11, is converted to a periodic or indexing motion appearing in an output drive gear 12. In a typical cycle, the output member 12 will accelerate from a rest or dwell position to a constant drive speed, and, at a predetermined moment, decelerate to a rest position. Driving the spindle carrier of a multiple-spindle screw machine, for example, this cycle represents a bodily displacement of all the multiple spindles, each spindle moving to its next adjacent station. The cycle repeats itself continuously to present any desired number of stations or dwells and is susceptible of various time delays introduced during the dwell or rest period.

Assuming, again by way of example, that the mechanism 10 is being utilized to index or periodically rotate a multiple-spindle carrier or a turret, the main motor is coupled to the input member 11 to impart continuous rotation thereto and the output member 12 is coupled through a suitable gear train (not shown) to the spindle carrier. In the absence of control signals introduced into the mechanism in a manner to be described below, the multiple-spindle carrier will be advanced in stepped rotation about its axis to present its individual spindles to successive stations. Normally, the dwell between station-advancing motions is brief. By introducing control signals into the mechanism during any station dwell at which it is desired to perform operations, the dwell can be prolonged for any desired interval, which is a function normally defined by the programming apparatus of the machine tool. The particular stations at which operations are performed and the exact duration of the prolonged dwells, being a matter of machine-tool programming, are not the direct concern of the present invention.

The apparatus 10 includes a frame assembly 13, at the input end of which the pulley wheel 11 is secured to a driving cup 14 rotatably supported in the frame in a ball-bearing assembly 15. Rotatably supported in the driving cup 14 by one of its ends in a ball-bearing assembly 16 is a clutch-shaft member 17, the inner end of which carries the sun gear 21 of a planetary-gear system, indicated generally by the numeral 19 and connected as a step-down system. The planetary-gear assembly 19 includes a spider or cage 18 rotatably supported on the shaft 17 and carrying plural (e.g. three) planetary gears 20, each rotatably mounted thereon. The planetary gears 20 also mesh with an internal ring gear 21a fixed to the frame assembly 13. The axles or stub shafts 20a about which the planetary gears 20 rotate in the spider 18 are extended axially and supported in a rotary sleeve assembly 24, within which an extension 22 of an output shaft 29 is rotatably mounted by means of the roller-bearing assembly 23.

The rotary sleeve 24 is formed with splines 24a on its outer surface which are in radial opposition to complementary splines 25a formed in the inner cylindrical surface of a second rotary sleeve or intermediate member 25. A short line of bearing balls 26 is disposed in each pair of complementary splines 24a, 25a, thus affording a rotary driving coupling between the two sleeves 24 and 25 and also affording limited freedom for axial movement by the sleeve 25 on the sleeve 24. The outer end of the sleeve 25 carries an internally threaded ring nut 25b which meshes with an externally threaded multi-start helix portion 27 integral with output shaft 29 and separated from the sleeve 24 by a retainer ring or washer 28 at its inner end. The output shaft 29 is supported in the frame assembly 13 by a combined radial and thrust bearing assembly 30. The output member or gear 12 is also secured to the shaft 29 by key means 31 and by a nut 32 holding the gear 12 axially inwardly against the inner race of the ball-bearing assembly 30, the inner end of the race abutting a shoulder 29a of the shaft 29. The entire output assembly is thus held fixed against axial movement.

The threads of the cylindrical helix portion 27 and of the ring nut 25b engaged therewith are arranged on a relatively steep pitch angle, preferably approximately 45°, so that axial displacement of the ring nut 25b along its helix 27 results in relative rotation between the nut 25b and shaft 29. The threads also afford a direct rotary driving coupling between the sleeve 25 and the helix 27 due to the axially fixed mounting of the latter. The outer surface of the axially movable intermediate sleeve member 25 is formed with a circumferential cam track 33 entered by a pair of cam-follower rollers 34 rotatably mounted on fixed carriers 35 secured to the frame assembly 13 at diametrically opposed points. The cam-track pattern is illustrated in developed form in FIGURE 3 and will be described in greater detail below. For purposes of the description at this point, the cam track 33 causes the sleeve 25 to be driven to and fro, axially, in response to the purely rotary component from the driving sleeve 24, and the output rotation of the member 12 includes, at different times, a component of rotary motion which adds to the motion of the driving sleeve 24 and a component which subtracts therefrom. Thus, the cam and its associate parts constitute a motion-modifying mechanism for modifying the rotary movement of the member 12. Appropriate pitch of the cam track 33 (in relation to the pitch of helix 27) causes the rotary motion to be fully offset, i.e. reduced to zero, for specified intervals of each cycle of operation.

The rotary shaft 17, which furnishes the input motion for the planetary-gear system 19, adapted to be selectively coupled to the rotating driving cup 14 and to the frame assembly 13 through a multiple-clutch mechanism indicated generally by the numeral 36. The multiple-clutch assembly 36 includes a first or clutching stage 37 to selectively couple the shaft 17 to the driving cup 14, and a second or braking stage 38, operated in complementary fashion with the clutch stage 37, to couple the shaft 17 to the frame assembly 13. The clutch assembly 37 includes a pair of end-thrust members or rings 37a and 37b received in keyways or splines 39 for freedom of axial movement. Disposed between the end-thrust rings 37a and 37b are a plurality of friction elements 40, also coupled to the shaft 17 through the splines 39 for freedom of axial movement. Interleaved with the friction elements 40 are a plurality of friction elements 41 which are carried by a circumferential array of axial fingers 42 on the driving cup 14, the elements 41 including radial lugs 41a to fit between adjacent fingers 42. In this fashion, the friction elements 41 have freedom for axial movement and are adequately held against radial displacement.

Similarly, the braking stage 38 includes end-thrust rings 38a and 38b between which are stacked first friction elements 43 which turn with the shaft 17 and, interleaved therewith, friction elements 44 having radially extending lugs 44a received in axial grooves 45a in a cup member or sleeve 45 which is received in a sleeve bearing 46 for limited axial movement. The sleeve 46 is also mounted for limited axial movement in a bore of the frame assembly 13, both members 45—46 being secured against rotation by pin 47 held by the frame assembly 13. The cup or sleeve member 45 is formed of ferro-magnetic matetial and constitutes the armature of an electro-magnetic actuator 48 having a fixed field structure 49 secured to the sleeve bearing 46. The field assembly 49 includes a winding 49a connected by a conduit 49b to a suitable programming controller 50 for selective energization thereof.

In the form shown, when winding 49a is not excited, friction elements 43—44 are engaged to provide brake action for shaft 17 (and at the same time, clutch disengagement at 40—41). Similarly, when winding 49a is excited, friction elements 40—41 are engaged to clutch shaft 17 to the drive means 11—14 (and at the same time, for brake disengagement at 43—44).

The armature 45 is normally urged axially away from the field structure 49 by a spring which preferably takes the form of a Belleville spring 51 carried by the shaft 17 and reacting thereagainst through the shoulder means 52 and reacting against the armature 45 through a thrust-bearing assembly 53. Fixed to the end of sleeve bearing 46 against thrust shoulder 46a is a thrust washer 54a which, through thrust bearing 54, clamps the clutch stage 37 to couple shaft 17 to the drive pulley 11 when the coil 49a of the field assembly is energized. The outer limit of axial travel of the end-thrust piece 37a of the clutch stage 37 is defined by a stop shoulder 55 on the shaft 17. Similarly, the outer limit of axial travel of the end thrust piece 38a of the brake stage 38 is defined by a stop shoulder 56, also on the shaft 17.

In operation, assuming a constant or continuous rotary motion is introduced into the unit 10 through the pulley 11, and the output member or gear 12 is coupled to a movable part (e.g. gear 12a) to be indexed, the control operation begins by energizing the coil 49a of the multiple-clutch assembly 36 to establish a driving connection between the input member 11 and the output member 12 of the illustrated drive mechanism. Driving engagement is effected through the clutch stage 37, which couples the driving cup 14 to the rotary shaft 17. The friction elements 40 and 41 are compressed (via spring-loading at 51) into frictional driving engagement by the axial thrust of the integral sleeve assembly which includes magnet 49, sleeve 46, and thrust washer 54a, through bearing 54 and the end-thrust pieces 37a and 37b of the clutch stage 37 to the shoulder 55. The thrust reaction for the clutch stage 37 is through the armature 45 (which at this time is held against axial displacement by the force of Belleville spring 51 through bearing 53), to abutment ring 52. Once the elements 40—41 of clutch stage 37 are fully compressed, the slight air gap remaining between the actuator 48 and armature 45 is closed as the armature is attracted axially to the left; this leftward movement (through bearing 53) deflects Belleville spring 51 to the left, thus relieving the compression force on the brake stage 38 (through thrust collar 53a and ring 38b) to disengage the brake stage. Assuming for the moment that the clutch stage 37 remains engaged continuously according to a predetermined program, say through stations 6, 1, and 2 of FIGURE 4, an output motion of the members 12—12a will occur in accordance with the pattern indicated for these stations in the graph or curve A of FIGURE 4. The dwells 60d at stations 3, 4 and 5 represent cutting time during which clutch stage 37 is disengaged and brake stage 38' is engaged.

The graph A of FIGURE 4 includes a rising portion 60a representing acceleration of the output member 12, a flat portion 60b representing continuous rotary motion and a downwardly sloping portion 60c representing deceleration which brings the output member 12 to rest for a period indicated by the numeral 60d, representing a dwell. After the dwell interval 60d the cycle repeats. When used to index a machine-tool part, such as a spindle carrier, a slide, or a turret, the drive unit is so arranged that during the occurrence of each interval 60d, appropriate alignment of the machine-tool parts obtains, so that a cutting cycle may proceed while the index mechanism is breaked at 38.

When it is desired to perform work operations at the alignment points, the brake-clutch unit 36 is actuated (by de-energizing coil 49a) to disengage the clutching stage 37 and to engage the brake stage 38 which, being coupled to the frame, operates as a brake to continue the dwell interval 60d for any period necessary to accomplish the desired operation. Control of the multiple-clutch unit 36 to disengage the clutch and to engage the brake is effected through the programming device or controller 50 which de-energizes the electromagnetic actuator 49 to release the armature 45, thus permitting the Belleville spring 51 to again compress the brake stage 38 between collar 53a and abutment 56 to stop rotation of sleeve 25 while the cam rolls 34 are in the braking zone 33d of cam path 33, where the velocity of output shaft 29 is always zero, as will be described. This relieves the thrust load on the clutch stage 37 to free the driving cup 14 from the rotary shaft 17. The graph B of FIGURE 4 shows de-energizing pulses 61 for the winding 49a occurring during the dwell period 60d to hold the output member 12 in its fixed position. The de-energizing pulses 61 of the graph B, it will be observed, occur after the normal dwell interval 60d (defined at cam portion 33d) has begun.

The mechanism whereby the output member accelerates, attains a substantially constant speed of rotation, decelerates and dwells, all as indicated by the curve sections 60a, b, c, and d will now be described having reference to FIGURE 1. With the shaft 17 rotating continuously and in a clockwise direction, as viewing from the input end, the telescoping sleeves 24 and 25 will be rotated continuously. The sleeves rotate at a substantially reduced rate due to the action of the planetary-gear system, a typical rate reduction being 7:1. As the intermediate sleeve 25 rotates, the cam-follower rollers 34 (supported by the fixed carriers 35 in the frame assembly 13) will impart axial thrust to the sleeve 25 in accordance with the shape of the continuous cam track 33, which is illustrated in developed form in FIGURE 3.

The cam track 33 is laid out to include an accelerating radius portion 33a an elongated linear-rise or constant-speed drive portion 33b, a decelerating radius portion 33c, and a dwell portion 33l. The decelerating radius portion 33c and the accelerating radius portion 33a are seen to be oppositely directed curves, tangentially connecting the upper and lower limits of the rise portion 33b, and closely connected to each other at a dwell portion 33d. These cam portions determine the sections 60a, b, c and d, respectively, of the graph of FIGURE 4a, and they are related to the lead of threads of the helix 27, as will be described. The helix angle of the uniform dwell portion 33d is complementary to and in the same direction (i.e. effectively opposite in sign) as the angle of helix 27 so that the leads of both helices are equal.

With the system at rest, and with the rolls 34 approximately in the center of the dwell portions 33d as shown in FIGURES 1 and 3, engagement of clutch 37 transmits reduced rotary motion through planetary train 19, sleeve 24, and balls 26, to the sleeve-and-ring-nut assembly 25—25b, the dwell 33d reacting on the stationary rolls 34 to displace the sleeve and nut axially outwardly. As the sleeve 25 is driven axially outwardly by the accelerating cam-track portion 33d, ring nut 25b merely screws itself along the helix 27 without transmitting any rotary motion to integral output shaft 29 due to the complementary helix angles of helix 27 and cam dwell 33d. It will be understood that during dwell 33d shaft 29 is held stationary by the massive driven member 12a meshing with output gear 12.

As cam rolls 34 enter and progress through the accelerating radius portion 33a, the axial velocity of the sleeve and nut 25—25b gradually decelerates to zero, the decelerating ring nut 25b reacting with its coacting helix 27 to gently start rotation of integral helix and shaft 29, to a point where the rotary velocity of shaft 29 and the sleeve assembly 25 are equal; the latter condition occurs when the rolls 34 are on the crown of the radius portion 33d.

As the rolls 34 proceed from the crown through the remaining part of the radius portion into the uniform speed portion 33b, the nut-and-sleeve assembly is displaced axially inwardly (to the right, in the sense of FIGURE 1) at a gradually accelerating velocity from zero at the crown of the radius, to maximum uniform velocity through the cam portion 33b. The inward axial displacement of the sleeve-and-nut assembly thrusts the nut 25b against or into its coacting helix 27 so that the cam action, so to speak, of the threads of the nut thrusting against the threads of the helix gradually accelerates the rotary velocity of the integral helix and shaft 29 from normal when the rolls 34 are on the crown of the radius 33a, to uniform accelerated rotation as the uniform-speed portion 33b rotates past rolls 34.

Thus, during the uniform-speed portion 33b of the index cycle, the rotational component of the sleeve 25 is transferred directly to the rotary helix nut 27, and in addition, the rectilinear motion of the sleeve 25 is converted into rotary motion. The two rotary motions add together for inward translational movement of the sleeve 25 to produce the curve sections 60a and 60b of the graph A of FIGURE 4, this corresponding to the cam-track sections 33a and 33b.

When the cam-follower rolls 34 reach the deceleration portion 33c, the sleeve 25 will be approaching its innermost position at a decreasing rate, and as the rolls 34 enter the crown of the radius portion 33c, the axial velocity of the sleeve assembly 25 decelerates to zero and the rotary speed of output shaft 29 decelerates to normal, i.e., to that of the sleeve assembly 24. As the rolls 34 leave the crown, through the remaining curve of the decelerating portion 33c to re-enter the dwell portion 33d, the sleeve assembly is again displaced outwardly, the speed of shaft 29 continuing to decelerate from normal (at the crown) to zero speed (as the rolls 34 re-enter the dwell portion 33d). Once rolls 34 have re-entered the dwell portion 33d, the ring nut 25b again screws itself along the helix 27 without transmitting any rotary motion to its integral ouput shaft 29, as will be understood. It is at this time (i.e. while rolls 34 are in dwell 33d) that the magnet assembly 49 is de-energized, thus disengaging the clutch stage 37 and applying braking effort to the rotary system including shaft 17, planetary-gear system 19, and the rotary, telescoping sleeves 24 and 25, to bring them to rest. It will be understood that the programming device 50 may be set to engage the brake at any desired point within the dwell portion 33d, as by synchronization with output-shaft rotation, suggested by gear 80 and connection 81; clutching to initiate indexing may also be controlled by means 50, but synchronized by other means 82 coordinated say with movement of a cam (not shown) forming part of the work-cutting mechanism of the machine.

When the clutch stage 37 is engaged to begin an indexing cycle, the only starting load imposed on the clutch is that required to place the drive assembly (which includes shaft 17, planetary system 19, and coacting sleeves 24—25) in rotation. The generous accelerating and decelerating radii 33a—33d softly cushion the start and finish of the indexing movement of the spindle-carrier or turret mass, as indicated by the respective curves 60a—60c of graph A FIG. 4, the decelerating radius 33d being preferably somewhat greater than the radius 33a to more softly absorb or cushion the reaction of inertia forces (due to the speed of the indexed mass) to the frame, as indicated by the more gentle slope of the curve 60c. Thus, the helix angle of the multistart threads of helix 27 and the complementary helix angle of the dwell portion 33d may be relatively steep, so that the major portion of the periphery of the sleeve 25 is available for a relatively long slow uniform-speed section 33b, as represented by curve 60b of graph A. The described arrangement will be seen to permit much faster index of the spindle-carrier or turret mass within a given time without generating destructive inertia forces.

An inertia load will be imposed on the system as the deceleration phase, represented by the curve 60d, begins. Here the inertia of the load, the driving member 12, the helix 27, and its integral shaft 29 will be referenced directly to the frame assembly 13 through the cam roll carriers 35. The clutch stage 37 remains engaged through the deceleration phase without being subjected to high inertia loading. Likewise the driving motor and the planetary-gear system 19 are isolated from the inertia load of deceleration. When the brake 38 is activated, it will be called upon only to arrest the rotary movement of the shaft 17, the planetary-gear system 19, the shaft 22, and the sleeves 24 and 25, all of which have low moments of inertia relative to that of the load, such as the multiple-spindle carrier of a screw machine, for example.

In the present disclosure, two diametrically opposite roller and carrier assemblies 34—35 are fixed to the frame to permit axial displacement of the sleeve assembly without cramping or binding and at the same time to more evenly distribute the forces of reaction to the frame 10. For this reason, as shown in FIG. 3, two identical diametrically opposite cam paths 33 must be provided in the periphery of sleeve 25 so that, for each index of the turret or spindle carrier from station to station, the sleeve assembly 25 and the output member 12 will rotate one-half revolution, it being understood that (as long as clutch 37 is engaged) the rotary velocity of the sleeve assembly is constant while that of the output shaft 29 is variable due to the axial displacement of the sleeve assembly on the helix 27. Thus, for a program as defined by the graph A of FIGURE 4, after the metal-cutting event 60d is completed at station No. 5, the clutch stage 37 is engaged as at 61', and the sleeve assembly 25 will make two complete revolutions at normal velocity during which the output shaft 29 will make four successive intermittent half revolutions or indexes (through station Nos. 6, 1, 2) until the clutch stage is disengaged, as at 61 at the start of the metal cutting event 60d at station No. 3. As shown in graph A, metal cutting is to be accomplished in stations 3, 4 and 5, it being understood that the cutting time or dwell 60d may vary for each station depending on the machine set up.

Referring now to FIGURE 2, a mechanism is illustrated wherein the motion-modifying portion of the system can be disabled in such manner that the output member is not brought to rest at one or more successive stations. Parts corresponding in general appearance and function to those of the arrangement of FIGURE 1 are identified in FIGURE 2 by like, primed reference numerals. The construction differs particularly in the addition of a rotatable sleeve 62 supported by a pair of ball-bearing assemblies 63 and 64, the cam rollers 34' together with their supports 35' being carried by the sleeve 62. The sleeve 62 includes a pair of radial apertures 65 flared at their receiving ends to permit easy entry of the corresponding tapered end of a retractable stop pin 67 radially movable in a supplementary frame 68 affixed to the frame assembly 13'. The frame part 68 carries a rotary solenoid 69 coupled through a pinion 70 to the rack 71 of the stop pin 67. A compression spring 72 normally urges the pin 67 radially inwardly toward the rotatable sleeve 62. A roller 67' is mounted in the tapered end of pin 67 for engagement with the periphery of sleeve 25' when the solenoid 69 is de-energized, so that scuffing contact is avoided. Excitation of the rotary solenoid 69 rotates the pinion 70 to drive the rack 71 to lift the pin 67 to free the rotatable sleeve 62 from the frame. With the sleeve 62 free to rotate, there is no reference against which the cam follower 34 can work to drive the sleeve 25' in an axial direction. Therefore, rectilinear or motion-modifying action of the sleeve 25 cannot exist, and the purely rotary motion of the planetary-gear system is transmitted to the output member 12'. When the rotary solenoid 69 is de-energized, the lock pin 67 moves inwardly to engage the first radial hole 65 which appears therebeneath, thus re-establishing the rectilinear motion-modifying phases of the operation. In other respects, the system of FIGURE 2 functions in the same way as the system of FIGURE 1, although I show a different multiple-clutch system 36', as disclosed in my pending application, Serial No. 737,720, filed May 26, 1958. Many of the parts of this system as shown in FIGURE 2 are the same as those of the structure shown in FIGURE 1 so that like parts are identified with the same reference numbers except that they are primed in FIGURE 2. The system of FIGURE 2 comprises a clutch stage 37', a brake stage 38', and a frame-based magnetic actuator 49'. When the coil 49a' of the actuator is energized, the rotating armature 45' is attracted to and rotates the thrust member 74, causing the balls 76 to roll the opposed parallel surfaces of the grooves 74a—75a of the thrust member and pressure plates 74—75, respectively, thus spreading these two elements apart to disengage the brake stage 38' and to engage the clutch stage 37'. When the coil of the actuator 49' is de-energized, the clutch is released and the brake is automatically applied, all as described in said pending application.

Referring now to FIGURE 4, the graphs C and D illustrate the operation of the station-skipping mechanism described above. For purposes of explanation it will be assumed that the programming mechanism has been set up for the work cycle shown in graph A of FIGURE 4 for metal cutting between indexes in stations 3, 4 and 5, and for continuous skip-indexing through stations 6, 1 and 2, and that the cutting operations represented by the broken intervals 60d in stations 3, 4, and 5 have been completed. Upon completion of the cutting operation at station No. 5, the programming mechanism causes substantially simultaneous energization of the magnetic actuator 49' and the rotary solenoid 69 at a point as defined by the reference 73 (as shown on companion graphs C and D of FIGURE 4) to engage the clutch stage 37 and to withdraw the lock pin 67, thus freeing carrier sleeve 62 for rotation. Rotary motion causes the nut and sleeve assembly 25' to screw itself along the helix 27' of output shaft 29', which is held stationary by the resistance of the load mass through output gear 12'; since the roll-carrier sleeve 62 is fixed against axial displacement, and since the dwell portion 33d (of the cam path 33) is of the same lead as the helix 27', sleeve 25' screws itself along the rollers 34' without imparting any motion to the carrier sleeve. As the rollers enter the accelerating radius 33a, the output shaft 29' starts to rotate, accelerating from zero speed to that of the sleeve assembly 25' or normal velocity, as defined by the curve 60a' in graph C, when the rollers 34 are at the crown of the radius 33a. At this point, the sleeve and nut assembly 25' starts to displace axially inwardly to continue acceleration, but the resistance of the index-load mass to further acceleration forces the rollers to remain at the crown of the radius, thus acting as keys, so to speak, to lock the carrier sleeve 62, and sleeve-and-nut assembly 25' together, so that they now rotate in unison at uniform speed to likewise rotate, or skip index the load (spindle carrier or turret) through stations 6, 1, and 2, as indicated by the "normal" velocity line 66 of graph C. Before the skip-index sequence can be completed, however, the lock pin 67 must re-engage and lock the carrier sleeve against rotation before the last station to be passed is reached. To this end, the programming system de-energizes solenoid 69 at a point prior to station 2, as defined by the reference 73' on graph D, and spring 72 urges the lock pin 67 into the next approaching aperture 65 of the carrier sleeve to lock it against further rotation, at which time the rollers 34 roll from the crown through the reverse curve of the accelerating radius 33a to displace the sleeve assembly 25' axially inwardly, thus accelerating the current from "normal" uniform speed to uniform accelerated speed, as indicated at 60a'' immediately following station No. 2 of graph C; as a practical matter, the further acceleration of the indexed load at 60a'' is so smooth that it is not visually perceptible to the observer. The last phase of the skip-index cycle through uniform speed, and deceleration to zero velocity is precisely the same as set forth for the disclosure of FIGURE 1, as will be seen by comparing the index-cycle curves between stations 2 and 3 of the graphs A and C.

It will be seen that I have disclosed a very fast smooth-indexing mechanism which permits either intermittent or continuous skip indexing through a plurality of work stations. Depending upon application requirements, and for certain types of machine tools, the programming system may be set up to provide random-skip indexing through any number of stations at any portion of a multiple-station work-piece cycle. Also, the indexing mechanisms herein described may be arranged to run in either direction, it being understood that in such an arrangement the accelerating and decelerating radius portions would preferably be identical.

While the invention has been described in detail for the preferred forms shown, it will be understood that modifications may be made within the scope of the invention, as defined in the claims which follow.

I claim:

1. Transmission for indexing means for driving a movable output member periodically among a range of positions comprising a frame, a rotary input member adapted to be connected to a driving source, intermediate drive means including a member supported in the frame for rotary and axial movement and interposed between the movable output member and the input member, means to couple the input member to the intermediate member to impart rotary movement thereto, cam means including complementary track and follower parts to shift the intermediate member axially in response to rotation thereof, a sleeve surrounding said intermediate member and rotatably supported by the frame, one of said cam parts being carried by the sleeve and the other by the intermediate member, means to releasably secure said sleeve against rotation with respect to the frame, and means to couple the intermediate member to the movable output member including helical-thread means to transmit rotary motion of the intermediate member as a first component of movement to the output member and to convert axial movement of the intermediate member into a second rotary component of movement in the output member, said helical-thread means having a pitch related to said cam means to sequentially accelerate and decelerate the movable member, whereby releasing the sleeve for rotation with the intermediate member disables the driving force of the cam means.

2. Transmission for indexing means as set forth in claim 1, said cam and thread means being relatively pitched to bring the movable member periodically to rest, and means to selectively couple the movable member and intermediate drive means to the frame and to the input member, whereby the rest period of said movable member can be prolonged for any desired interval.

3. Transmission for indexing means for driving a movable output member periodically among a range of positions comprising a frame, a rotary input member adapted to be connected to a driving source, intermediate drive means including a member supported in the frame for rotary and axial movement and interposed between the movable output member and the input member, means to couple the input member to the intermediate member to impart rotary movement thereto, cam means to shift said intermediate member axially in response to rotation thereof, means to couple said intermediate member to said movable output member including helical-thread means to transmit rotary motion of said intermediate member as a first component of movement to the output member and to convert axial movement of the intermediate member into a second rotary component of movment in the output member, said helical-thread means having a pitch related to said cam means to sequentially accelerate and decelerate the movable member, and selectively operable means to disable said cam means, whereby the intermediate member is freed of its axial driving force.

4. Transmission for indexing means for driving a movable member periodically among a range of positions comprising a frame, a rotary output member, a rotary input member adapted to be connected to a driving source, intermediate drive means interposed between the output member and the input member, said intermediate drive means including a first member supported in the frame for rotary and axial movement, a second member supported in the frame for rotary movement, said first and second members being fitted one within the other, opposed axial grooves in the opposed surfaces of said first and second members, means including balls in said grooves to couple the input member to said first member to impart rotary movement thereto, retractable holding-pin means carried by the frame and normally securing the second member against rotation, complementary holding means on the second member to secure the second member in a predetermined angular position, endless-track cam means coacting between said first and second members to shift said first member axially, means including a threaded coupling coacting between said first member and said output member and operative to translate axial movement of said first member in one direction into rotary movement of the output member in one direction and to translate axial movement of said first member in the other direction into a cancellation of rotary movement of the output member, and control means to retract and engage said holding-pin means.

5. Transmission for indexing means as set forth in claim 4, said holding pin means including a roller bearing on the end to ride on the surface of the sleeve member between said complementary holding means thereon.

6. Transmission for indexing means, comprising a frame, rotary input and output members journaled in said frame, drive means for continuously driving said input member, a rotatable intermediate coupling member axially slidably keyed to said input member and connected to said output member by a helically-threaded engagement, cam means coacting between said frame and said coupling member to impart axial motion to said coupling member upon rotation thereof, said helical-thread engagement having a pitch related to said cam means to sequentially accelerate said output member to maximum speed and to decelerate said output member to zero speed, and selectively operable means engageable and disengageable with said cam means and effective at that angular position of said input member which corresponds to zero speed of said output member for disabling said cam means.

7. Transmission for indexing means according to claim 6, in which said drive means includes a clutch, and selectively operable means effective at that angular position of said input member which corresponds to zero speed of said output member for disabling said clutch.

8. Transmission for indexing means as set forth in claim 6 wherein said output member, said coupling member and said cam means are coaxially nested relative to each other.

9. Transmission for indexing means, comprising a frame, rotary input and output members journaled in said frame, drive means for continuously driving said input member, a rotatable intermediate coupling member axially slidably keyed to said input member and connected to said output member by a helically-threaded engagement, said coupling member and said output member being substantially coaxial with each other, cam means coacting between said frame and said coupling member to impart axial motion to said coupling member upon rotation thereof, said helical-thread engagement having a pitch related to said cam means to sequentially accelerate said output member to maximum speed and to decelerate said output member to zero speed, said drive means including a clutch, and selectively operable means effective at that angular position of said input member which corresponds to zero speed of said output member for disabling said clutch.

References Cited in the file of this patent
UNITED STATES PATENTS

| | | |
|---|---|---|
| 1,284,733 | Maier | Nov. 12, 1918 |
| 2,783,922 | Vogt | Mar. 5, 1957 |
| 2,818,743 | Zatsky | Jan. 7, 1958 |
| 2,852,960 | Brems | Sept. 23, 1958 |
| 2,876,653 | Meyer | Mar. 10, 1959 |